US011976242B2

United States Patent
Luo et al.

(10) Patent No.: US 11,976,242 B2
(45) Date of Patent: May 7, 2024

(54) SYSTEM OF ULTRA-LOW NITROGEN OXIDE EMISSIONS, NEGATIVE CARBON EMISSIONS AND CONTROL METHOD THEREOF

(71) Applicant: Zhejiang University, Hangzhou (CN)

(72) Inventors: Zhongyang Luo, Hangzhou (CN); Qinhui Wang, Hangzhou (CN); Chunjiang Yu, Hangzhou (CN); Jinsong Zhou, Hangzhou (CN); Mengxiang Fang, Hangzhou (CN); Yinchen Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/713,781

(22) Filed: Apr. 5, 2022

(65) Prior Publication Data

US 2023/0174867 A1 Jun. 8, 2023

(30) Foreign Application Priority Data

Dec. 7, 2021 (CN) .......................... 202111512131.4

(51) Int. Cl.
*C10B 53/02* (2006.01)
*B01D 45/16* (2006.01)
(Continued)

(52) U.S. Cl.
CPC .............. *C10B 53/02* (2013.01); *B01D 45/16* (2013.01); *C10B 41/00* (2013.01); *C10B 57/10* (2013.01)

(58) Field of Classification Search
None
See application file for complete search history.

(56) References Cited

U.S. PATENT DOCUMENTS 4,969,408 A * 11/1990 Archer .................... F23N 5/006
  700/285
5,226,927 A *  7/1993 Rundstrom ............... C10J 3/26
  48/68
(Continued)

FOREIGN PATENT DOCUMENTS

CN 103146403 A 6/2013
CN 105805733 A 7/2016
(Continued)

OTHER PUBLICATIONS

"What Is Pyrolysis?", Oct. 21, 2021 (WayBack Machine), Agricultural Research Serivce U.S. Department of Agriculture, https://www.ars.usda.gov/northeast-area/wyndmoor-pa/eastern-regional-research-center/docs/biomass-pyrolysis-research-1/what-is-pyrolysis/#.*

(Continued)

*Primary Examiner* — Jonathan Luke Pilcher
(74) *Attorney, Agent, or Firm* — Westman, Champlin & Koehler, P.A.; Amanda M. Prose; David D. Brush

(57) ABSTRACT

A system for use in carbon negative emission methods, a nitrogen oxide ultra-low emission system, an air supply device and a flow control module. The system for use in carbon negative emission methods enables biomass to produce inorganic carbon and pyrolysis gas/gasification gas to realize negative emission of carbon. The nitrogen oxide ultra-low emission system enables fuel to be in mixed combustion with the pyrolysis gas/gasification gas to remove nitrogen oxides, which realizes ultra-low emission of the nitrogen oxides. The air supply device is in communication with a biomass pyrolysis coupling partial gasification and is in communication with the system for use in carbon negative emission methods and the nitrogen oxide ultra-low emission system. The pyrolysis gas/gasification gas enters the nitrogen oxide ultra-low emission system. The flow control module controls a flow ratio of a pyrolysis (Continued)

agent/gasification agent entering the system for use in carbon negative emission methods and flow of the pyrolysis gas/gasification gas and air entering the nitrogen oxide ultra-low emission system.

4 Claims, 1 Drawing Sheet

(51) Int. Cl.
 *C10B 41/00* (2006.01)
 *C10B 57/10* (2006.01)

(56) References Cited

U.S. PATENT DOCUMENTS

| | | | | |
|---|---|---|---|---|
| 2002/0134019 | A1* | 9/2002 | Paisley | C10B 49/22 |
| | | | | 48/209 |
| 2008/0317657 | A1* | 12/2008 | Hall | C10B 49/10 |
| | | | | 423/437.1 |

FOREIGN PATENT DOCUMENTS

| | | | | | |
|---|---|---|---|---|---|
| CN | 106051750 | A | | 10/2016 | |
| CN | 107013902 | A | * | 8/2017 | |
| CN | 107013902 | A | | 8/2017 | |
| CN | 206724142 | U | * | 12/2017 | |
| CN | 109578961 | A | | 4/2019 | |
| CN | 110925749 | A | | 3/2020 | |
| CN | 111454739 | A | | 7/2020 | |
| CN | 112342045 | A | * | 2/2021 | C10B 53/02 |
| CN | 112342045 | A | | 2/2021 | |
| CN | 112410049 | A | * | 2/2021 | C10B 53/02 |
| CN | 113083009 | A | | 7/2021 | |

OTHER PUBLICATIONS

"Hydrogen Production: Biomass Gasification", May 13, 2021 (Wayback Machine), US Department of Energy Hydrogen and Fuel Cell Technologies Office, https://www.energy.gov/eere/fuelcells/hydrogen-production-biomass-gasification#:~:text=Gasification%20is%20a%20process%20that,%2C%20hydrogen%2C%20and%20carbon%20dioxide.*
Othman et al., "Partial Gasification of Different Types of Coals in a Fluidised Bed Gasifier", Jurnal Mekanikal , Jun. 2007, No. 23, 40-49.*
Copy William Harris "How Gasification Works" Jun. 2, 2009. HowStuffWorks.com, <https://science.howstuffworks.com/environmental/green-tech/energy-production/gasification.htm>, May 5, 2023.*
Espacenet translation of Li et al. (CN 107013902 A).*
Espacenet translation of Zhang et al. (CN 206724142).*
Espacenet Translation of Wang (CN 112342045).*
Espacenet Translation of Wang (CN 112410049).*
Bin Tian, Yingyun Qiao, Junfeng Fan, Lei Bai, and Yuanyu Tian, "Coupling Pyrolysis and Gasification Processes for Methane-Rich Syngas Production: Fundamental Studies on Pyrolysis Behavior and Kinetics of a Calcium-Rich High-Volatile Bituminous Coal", Energy & Fuels 2017 31 (10), 10665-10673, DOI: 10.1021/acs.ener.*
Chinese Office Action dated Jul. 25, 2022 for corresponding Chinese Application No. 202111512131.4, filed on Dec. 7, 2021.

* cited by examiner

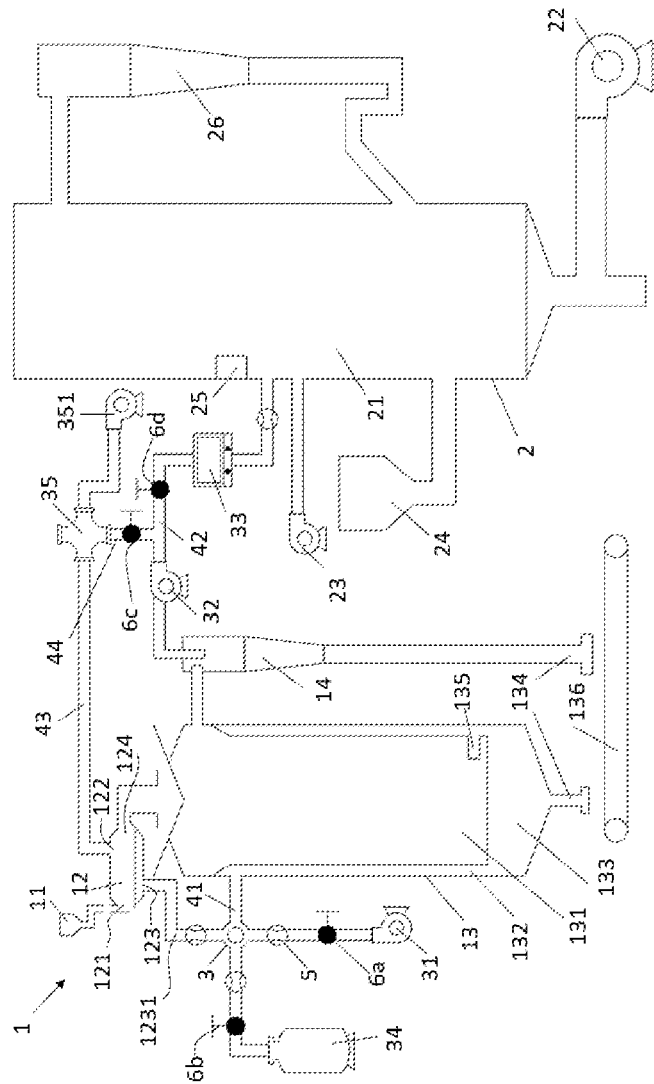

SYSTEM OF ULTRA-LOW NITROGEN OXIDE EMISSIONS, NEGATIVE CARBON EMISSIONS AND CONTROL METHOD THEREOF

TECHNICAL FIELD

The present invention relates to the technical field of energy saving and emission reduction, in particular to a biomass pyrolysis, gasification and combustion combined nitrogen oxide ultra-low emission and a system for use in carbon negative emissions methods and a control method.

BACKGROUND ART

In recent decades, environmental problems such as a greenhouse effect, glacier melting, acid rain and photochemical smog have become more and more serious, and threaten the safety of human beings and ecosystems, which is closely related to the extensive use of coal-based fossil fuel.

Biomass is a kind of renewable energy, it achieves zero emission of carbon and low emission of nitrogen oxides during its use due to its carbon neutrality and low nitrogen characteristics, and the use of the biomass to partially replace the fossil fuel can alleviate the environmental problems such as the greenhouse effect and acid rain to a certain extent.

Although the use of the biomass has already achieved zero carbon emissions and low nitrogen combustion, it still faces great challenges to achieve the strategic goals of carbon neutralization, carbon peaking and ultra-low emission of nitrogen oxides.

SUMMARY OF THE INVENTION

In view of the above problems, the present invention provides a nitrogen oxide ultra-low emission and system for use in carbon negative emissions methods and a control method, and ultra-low emission of nitrogen oxides and carbon negative emission are achieved by an integrated system combining biomass pyrolysis, gasification and combustion and a control method.

The present invention provides a nitrogen oxide ultra-low emission and system for use in carbon negative emission methods, comprising: a system for use in carbon negative emission methods, a nitrogen oxide ultra-low emission system, an air supply device and a flow control module, wherein the system for use in carbon negative emission methods is used for enabling biomass to have a pyrolysis coupling partial gasification reaction or enabling the biomass to have a pure pyrolysis reaction to generate inorganic carbon and pyrolysis gas/gasification gas; the inorganic carbon is used for returning to field treatment or making carbon-based materials such as activated carbon to realize negative emission of carbon;

the nitrogen oxide ultra-low emission system enables fuel to be in mixed combustion with the pyrolysis gas/gasification gas to remove nitrogen oxides generated by combustion of the fuel;

the air supply device is in communication with the system for use in carbon negative emission methods via a first pipeline, and provides a pyrolysis agent/gasification agent required for biomass pyrolysis coupling partial gasification, the air supply device is in communication with the system for use in carbon negative emission methods and the nitrogen oxide ultra-low emission system via a second pipeline, and the pyrolysis gas/gasification gas enters the nitrogen oxide ultra-low emission system via the second pipeline, and is in mixed combustion with the fuel in the nitrogen oxide ultra-low emission system to reduce the nitrogen oxide, so as to achieve ultra-low emission of the nitrogen oxide;

the flow control module controls a flow ratio of the pyrolysis agent/gasification agent entering the system for use in carbon negative emission methods and flow of the pyrolysis gas/gasification gas and air entering the nitrogen oxide ultra-low emission system.

According to the technical solution, the biomass generates the inorganic carbon and the reductive biomass pyrolysis gas/gasification gas through pyrolysis coupling partial gasification, the inorganic carbon can be used for returning to field treatment and soil improvement, since the inorganic carbon is difficult to be decomposed by soil microorganisms, this part of carbon can be sealed for a long time by performing returning to field treatment on it, and this part of carbon just comes from carbon dioxide in atmosphere fixed by the biomass, and finally negative emission of carbon is achieved. The inorganic carbon can also be used to make the carbon-based materials such as activated carbon adsorbents to adsorb harmful substances and accumulate and store them to achieve negative emission of carbon; the reductive biomass pyrolysis gas/gasification gas co-fires with biomass/coal solid fuel in the nitrogen oxide ultra-low emission realization system, and the nitrogen oxides are converted into nitrogen that is harmless to the environment through complex chemical reactions, and the removal rate of the nitrogen oxides can be as high as 80%, which realizes removal of the nitrogen oxide and achieves the purpose of ultra-low emission of the nitrogen oxide. The present invention regulates and controls the yield of the gasification gas/gasification gas and the component ratio, regulates and controls the yield of the inorganic carbon, and realizes the removal of the nitrogen oxide and the negative emission of carbon in the process of biomass utilization by combining biomass pyrolysis, gasification and combustion, and controlling the flow of flue gas entering the system for use in carbon negative emission methods and the flow ratio of the pyrolysis agent/gasification agent provided by the air supply device.

In an optional technical solution of the present invention, the system for use in carbon negative emission methods comprises a dryer, a pyrolysis coupling partial gasification reaction furnace and a first cyclone separator which are sequentially in communication via pipelines, the dryer dries the biomass provided, the dried biomass enters the pyrolysis coupling partial gasification reaction furnace via a second outlet of the dryer to undergo the pyrolysis coupling partial gasification reaction or the pure pyrolysis reaction, and the product after the reaction of the biomass enters the first cyclone separator via an outlet of the pyrolysis coupling partial gasification reaction furnace to undergo gas-solid separation.

According to the technical solution, drying the biomass before pyrolysis/gasification of the biomass is beneficial to improve the efficiency of pyrolysis/gasification of the biomass, combustion products are separated by the first cyclone separator, and the reductive pyrolysis gas/gasification gas obtained by separation enters the nitrogen oxide ultra-low emission system to reduce the nitrogen oxide, the combustion products are separated, so that full recovery of the inorganic carbon can be promoted, at the same time the entry of fine inorganic carbon in the combustion products into the nitrogen oxide ultra-low emission system is reduced, and the negative emission of carbon is promoted.

In an optional technical solution of the present invention, the pyrolysis coupling partial gasification reaction furnace comprises a reaction furnace body, a reaction furnace shell, an inorganic carbon chamber, an inorganic carbon emission port and a pyrolysis agent/gasification agent air port, the reaction furnace body is disposed inside the reaction furnace shell, a circulation space of the pyrolysis agent/gasification agent is formed between the reaction furnace shell and the reaction furnace body, the reaction furnace shell is in communication with an outlet of the first pipeline, the inorganic carbon chamber is disposed at a bottom of the pyrolysis coupling partial gasification reaction furnace, a bottom of the inorganic carbon chamber is provided with the inorganic carbon emission port, and the pyrolysis agent/gasification agent air port is formed in the reaction furnace body.

According to this technical solution, the reaction furnace body is used for the pyrolysis coupling partial gasification reaction to take place, the reaction furnace shell is in communication with an outlet of the first pipeline, and the pyrolysis agent/gasification agent provided by the air supply device enters the reaction furnace shell to provide gas and heat required for the reaction furnace body, and the pyrolysis agent/gasification agent in the reaction furnace shell enters the reaction furnace body through the pyrolysis agent/gasification agent air port to enable the biomass to undergo the pyrolysis coupling partial gasification reaction. According to different pyrolysis agents/gasification agents, the pure pyrolysis reaction can also take place in the reaction furnace body, for example, the pyrolysis agent/gasification agent is nitrogen, and the inorganic carbon in the combustion products generated in the reaction furnace body enters the inorganic carbon chamber and passes through the inorganic carbon emission port to be discharged, which realizes recovery of the inorganic carbon. The inorganic carbon can be used for returning to field treatment and soil improvement. Since the inorganic carbon is difficult to be decomposed by the soil microorganisms, this part of carbon can be sealed for a long time, and finally negative emission of carbon is achieved. The inorganic carbon can also be used to make the carbon-based materials such as activated carbon adsorbents, which can adsorb harmful substances and accumulate and store them to achieve negative emission of carbon.

In an optional technical solution of the present invention, the nitrogen oxide ultra-low emission system comprises a boiler and air supply mechanisms, the boiler is used for combustion of the fuel and the pyrolysis gas/gasification gas, the air supply mechanisms provide gas required for the combustion of the fuel, and the boiler is in communication with a top outlet of the first cyclone separator through the second pipeline.

According to this technical solution, combustion of the fuel in the boiler can provide heat to the outside, and the reductive pyrolysis gas/gasification gas obtained by separation of the first cyclone separator enters the boiler through the second pipeline to reduce the nitrogen oxides in the boiler to nitrogen, which achieves ultra-low emission of the nitrogen oxide.

In an optional technical solution of the present invention, the air supply mechanisms comprise a first air supply mechanism and a second air supply mechanism, the first air supply mechanism is disposed at the bottom of the boiler, and the second air supply mechanism is disposed corresponding to a combustion zone of the pyrolysis gas/gasification gas in the boiler.

According to this technical solution, the second air supply mechanism is disposed corresponding to the combustion zone of the biomass pyrolysis gas/gasification gas, and by additionally disposing a secondary air port in the combustion zone of the biomass pyrolysis gas/gasification gas, on the premise that it is guaranteed that the total air supply volume remains unchanged, the air volume of primary air is reduced, and reduced air is supplied into a hearth in the form of secondary air. When the primary air volume decreases, the combustion condition of the biomass solid fuel in a dense phase zone will change, the nitrogen oxide is partially removed in the dense phase zone, and the total removal efficiency of the nitrogen oxide is improved.

In an optional technical solution of the present invention, a fuel feed bin and an oxygen meter are further included, the fuel feed bin provides the fuel required for the combustion of the boiler, the number of the fuel feed bins is one or more, the oxygen meter is disposed corresponding to the combustion zone of the pyrolysis gas/gasification gas in the boiler, and the oxygen meter is used for monitoring the content of oxygen in the combustion zone of the pyrolysis gas/gasification gas.

According to this technical solution, the plurality of fuel feed bins can provide different fuels respectively. The fuel can be pure biomass fuel or pure coal fuel, or a mixture of biomass fuel and coal fuel. The oxygen meter ensures the ultra-low emission of the nitrogen oxide by monitoring the content of the oxygen in the combustion zone of the pyrolysis gas/gasification gas and the excess air coefficient, and adaptively adjusting the air supply volume of the air supply mechanism.

In an optional technical solution of the present invention, the air supply device comprises an air blower and a combustion chamber, the air blower is used for blowing in air/nitrogen, the air blower provides the pyrolysis agent/gasification agent (nitrogen/air) required for the system for use in carbon negative emission methods, an outlet pipeline of the air blower is in communication with an inlet of the first pipeline, the combustion chamber is in communication with a second inlet of the dryer via a third pipeline, the combustion chamber is used for combustion of part of the pyrolysis gas/gasification gas, and the combustion chamber is in communication with a middle part of the second pipeline via a fourth pipeline, and the first cyclone separator is in communication with the boiler via the second pipeline; flue gas generated by combustion in the combustion chamber enters the dryer through the third pipeline and provides heat for drying the biomass in the dryer, and after drying, this part of flue gas enters the first pipeline together with water vapor vaporized in the drying process of the biomass fuel.

According to this technical solution, gas blown in by the air blower is different, and reactions happening to the biomass system for use in carbon negative emission methods are different. When air is blown in, the pyrolysis coupling partial gasification reaction occurs in the pyrolysis coupling partial gasification reaction furnace, the increase of a ratio of an air gasification agent will increase the content of CO and $CH_4$ in a gasification product and the heating value of the gasification gas, but will reduce the content of $H_2$; when nitrogen is blown in, the pure pyrolysis reaction occurs in the pyrolysis coupling partial gasification reaction furnace, the content of reductive gas in the gas product, especially the content of $H_2$ and CO, will be greatly reduced, but the content of the inorganic carbon will be increased to some extent. In the case where the pyrolysis gas with a low $H_2$ and CO content can still achieve high denitrification efficiency, by controlling to only have the pyrolysis reaction in the pyrolysis coupling partial gasification reaction furnace, the yield of the inorganic carbon is increased while ensuring high denitrification efficiency, which achieves negative emission of carbon to a greater extent. The combustion chamber is in communication with the dryer to provide heat for drying the biomass. In an optional technical solution of the present invention, an induced draft fan and a gas component analyzer are further included, the induced draft fan and the component analyzer are disposed on the second pipeline, the induced draft fan is disposed at an inlet of the second pipeline, and the gas component analyzer is disposed at an outlet of the second pipeline. The induced draft fan is disposed, which is beneficial to rapidly introduce the biomass pyrolysis gas/gasification gas separated by the first cyclone separator into the boiler, and the gas component analyzer is used to analyze the component and content of the biomass pyrolysis gas/gasification gas entering the boiler.

In an optional technical solution of the present invention, the air supply device further comprises a first outlet pipeline and a water vapor generator, and the inlet of the first pipeline is in communication with a first outlet of the dryer via the first outlet pipeline; the flue gas generated by combustion in the combustion chamber is provided for the pyrolysis coupling partial gasification reaction furnace via the first outlet pipeline together with the water vapor vaporized when drying the biomass fuel as the pyrolysis agent/gasification agent; an outlet pipeline of the water vapor generator is in communication with the inlet of the first pipeline, and the water vapor generator provides the pyrolysis agent/gasification agent required for the pyrolysis coupling partial gasification reaction furnace.

According to this technical solution, the flue gas generated by the combustion of a small part of the pyrolysis gas/gasification gas in the combustion chamber is beneficial to provide heat for the pyrolysis coupling partial gasification reaction, and the increase in the proportion of a water vapor gasification agent will increase the content of $H_2$ in the gasification product, however, it will reduce the content of CO and $CH_4$, and also reduce the heating value of the gasification gas. By reasonably controlling the content of the water vapor gasification agent and the air gasification agent, the gasification product has both extremely high denitrification efficiency and high heating value, so that energy can be fully utilized.

In an optional technical solution of the present invention, a plurality of flow monitoring meters and a plurality of electric butterfly valves are further included, the plurality of flow monitoring meters are respectively disposed on the outlet pipeline of the air blower, the outlet pipeline of the water vapor generator, the first outlet pipeline and an outlet of the second pipeline; the plurality of electric butterfly valves comprise a first electric butterfly valve disposed on the outlet pipeline of the air blower, a second electric butterfly valve disposed on the outlet pipeline of the water vapor generator, a third electric butterfly valve disposed on the fourth pipeline, and a fourth electric butterfly valve disposed on the outlet of the second pipeline.

According to this technical solution, the ratio of the pyrolysis gas/gasification gas in the air blower, the water vapor generator and the combustion chamber can be regulated and controlled by adjusting the opening degrees of the first, second and third electric butterfly valves, and flow of each flow path can be monitored by the flow monitoring meter, which can regulate and control the component and yield of the biomass pyrolysis gas/gasification gas and the yield of the inorganic carbon, so as to achieve the purpose of optimal control over nitrogen oxide ultra-low emission.

The present invention further provides a control method of the nitrogen oxide ultra-low emission and a system for use in a carbon negative emission method, comprising the following steps:

when biomass in the system for use in the carbon negative emission method has a pure pyrolysis reaction, closing the second electric butterfly valve and the third electric butterfly valve; opening the first electric butterfly valve and introducing nitrogen, and opening the fourth electric butterfly valve; or when the biomass in the system for use in the carbon negative emission method has a pyrolysis coupling partial gasification reaction, opening the first electric butterfly valve, the second electric butterfly valve, the third electric butterfly valve and the fourth electric butterfly valve, the air blower blowing in air;

adjusting a flow ratio of water vapor entering the system for use in the carbon negative emission method, air and fuel gas generated in the combustion chamber together with water vapor vaporized when biomass fuel is dried by controlling the opening degrees of the first electric butterfly valve, the second electric butterfly valve and the third electric butterfly valve, thereby adjusting a component ratio of pyrolysis gas/gasification gas, the yield of the pyrolysis gas/gasification gas and the yield of inorganic carbon.

In an optional technical solution of the present invention, further comprising controlling temperature of the boiler, an excess air coefficient of the combustion zone of the pyrolysis gas/gasification gas in the boiler, a total excess air coefficient in the boiler, and a distribution ratio of air supply volumes of the first air supply mechanism and the second air supply mechanism to realize nitrogen oxide ultra-low emission.

Through the present invention, the deficiencies in the prior art can be solved, in the prior art, a biomass pyrolysis and direct combustion combined system, and a biomass gasification and direct combustion combined system exist, and no pyrolysis, gasification and combustion combined integrated system exists, and in the prior art, it focus on: 1. rationally opening and utilizing agricultural and forestry waste to prepare biochar; 2. overcoming the defect of coking on the heating surface, low boiler efficiency, large floor area, high maintaining cost and the like in biomass direct combustion power generation; 3. solving the problems of tar blockage or pipeline corrosion or the like in the process of biomass pyrolysis; and 4. solving the problem of low heat load when biomass boilers burn crop straw in an existing bioenergy power generation system.

The goal of the present invention is to achieve negative emission of carbon by returning the inorganic carbon produced by pyrolysis/gasification to fields, and making the carbon-based materials such as activated carbon adsorbents, and achieves ultra-low emission of the nitrogen oxide by mixed combustion of high temperature fuel gas and high temperature tar generated by pyrolysis/pyrolysis coupling partial gasification, and solid biomass/coal/biomass and coal mixed solid fuel; and at the same time, by controlling the flow ratio, reaction temperature, excess air coefficient, and primary and secondary air ratio of the different pyrolysis agent/gasification agent (high-temperature flue gas produced by the combustion of the water vapor, the air/nitrogen, and the pyrolysis gas/gasification gas (mainly containing nitrogen, carbon dioxide, and water vapor), the effects of nitrogen oxide emission reduction and carbon negative emission can be optimal.

BRIEF DESCRIPTION OF THE DRAWINGS

FIG. 1 is a structural schematic diagram of a nitrogen oxide ultra-low emission and system for use in carbon negative emission methods in an embodiment of the present invention.

REFERENCE NUMERALS system for use in carbon negative emission method 1; biomass feed bin 11; dryer 12; first inlet 121; second inlet 122; first outlet 123; first outlet pipeline 1231; second outlet 124; pyrolysis coupling partial gasification reaction furnace 13; reaction furnace body 131; reaction furnace shell 132; inorganic carbon chamber 133; inorganic carbon emission port 134; pyrolysis agent/gasification agent air port 135; inorganic carbon conveying belt 136; first cyclone separator 14; nitrogen oxide ultra-low emission system 2; boiler 21; first air supply mechanism 22; second air supply mechanism 23; biomass stock bin 24; oxygen meter 25; second cyclone separator 26; air supply device 3; air blower 31; induced draft fan 32; gas component analyzer 33; water vapor generator 34; combustion chamber 35; air blowing device 351; first pipeline 41; second pipeline 42; third pipeline 43; fourth pipeline 44; flow monitoring meter 5; electric butterfly valves 6a, 6b, 6c, 6d.

DETAILED DESCRIPTION

The technical solutions in embodiments of the present invention will be described clearly and fully hereinafter with reference to the accompanying drawings in the embodiments of the present invention. Obviously, the embodiments described are only some, but not all embodiments of the present invention. Based on the embodiments in the present invention, all other embodiments obtained by a person of ordinary skill in the art without involving any inventive effort fall within the protection scope of the present invention.

First Embodiment

Please refer to FIG. 1, the present invention provides a nitrogen oxide ultra-low emission and system for use in carbon negative emission methods, comprising: a system for use in a carbon negative emission method 1, a nitrogen oxide ultra-low emission system 2, an air supply device 3 and a flow control module (not marked in FIG. 1), wherein, the system for use in the carbon negative emission method 1 is used for enabling biomass to have pyrolysis coupling partial gasification to generate inorganic carbon and pyrolysis gas/gasification gas, and the inorganic carbon is used for returning to field treatment or making carbon-based materials such as activated carbon to realize negative emission of carbon; the nitrogen oxide ultra-low emission system 2 is used for enabling fuel (including pure coal fuel, biomass fuel or mixed fuel of biomass and coal) to be in mixed combustion with the pyrolysis gas/gasification gas to remove nitrogen oxides generated by combustion of the fuel; the air supply device 3 is in communication with the system for use in the carbon negative emission method 1 via a first pipeline 41, and provides a pyrolysis agent/gasification agent required for the biomass pyrolysis coupling partial gasification, the air supply device 3 is in communication with the system for use in the carbon negative emission method 1 and the nitrogen oxide ultra-low emission system 2 via a second pipeline 42, and the pyrolysis gas/gasification gas generated by the system for use in the carbon negative emission method 1 enters the nitrogen oxide ultra-low emission system 2 via the second pipeline 42, and is in mixed combustion with the fuel in the nitrogen oxide ultra-low emission system 2 to reduce the nitrogen oxide generated in the nitrogen oxide ultra-low emission system 2; the flow control module controls a flow ratio of a pyrolysis agent/gasification agent entering the system for use in the carbon negative emission methods 1 and flow of the pyrolysis gas/gasification gas and air entering the nitrogen oxide ultra-low emission system 2.

Due to the above mode, the biomass generates the inorganic carbon and the reductive biomass pyrolysis gas/gasification gas through pyrolysis coupling partial gasification of the system for use in the carbon negative emission methods 1, the inorganic carbon can be used for returning to field treatment and soil improvement, since the inorganic carbon is difficult to be decomposed by soil microorganisms, this part of carbon can be sealed for a long time, and finally negative emission of carbon is achieved. The inorganic carbon can also be used to make the carbon-based materials such as activated carbon adsorbents to adsorb harmful substances and accumulate and store them to achieve negative emission of carbon; the reductive biomass pyrolysis gas/gasification gas co-fires with biomass/coal solid fuel in the nitrogen oxide ultra-low emission system 2, and the nitrogen oxides generated in the nitrogen oxide ultra-low emission system 2 are converted into nitrogen that is harmless to the environment through complex chemical reactions, which realizes removal of the nitrogen oxide and achieves the purpose of ultra-low emission of the nitrogen oxide. The present invention regulates and controls the yield of the gasification gas/gasification gas and the component ratio, regulates and controls the yield of the inorganic carbon and realizes the removal of the nitrogen oxide and the negative emission of carbon in the process of biomass utilization by combining biomass pyrolysis, gasification and combustion, and controlling the flow ratio of the pyrolysis agent/gasification agent entering the system for use in the carbon negative emission method 1 and the flow of the gasification gas/gasification gas and air entering the nitrogen oxide ultra-low emission system 2.

In a preferential embodiment of the present invention, the system for use in carbon negative emission methods 1 comprises a biomass feed bin 11, a dryer 12, a pyrolysis coupling partial gasification reaction furnace 13 and a first cyclone separator 14 which are sequentially in communication via pipelines. Specifically speaking, the biomass feed bin 11 provides biomass fuel of a pyrolysis coupling gasification reaction; a first inlet 121 of the dryer 12 is in communication with an outlet of the biomass feed bin 11, so as to dry the biomass entering the dryer 12, a second outlet 124 of the dryer 12 is in communication with the pyrolysis coupling partial gasification reaction furnace 13, the dried biomass enters the pyrolysis coupling partial gasification reaction furnace 13 via the second outlet 124 of the dryer to have a pyrolysis coupling partial gasification reaction or a pure pyrolysis reaction, the pyrolysis coupling partial gasification reaction furnace 13 is used for enabling the biomass to undergo the pyrolysis coupling partial gasification reaction to produce high-temperature pyrolysis gas/gasification gas and inorganic carbon, and the product after the biomass reaction enters the first cyclone separator 14 via an outlet of the pyrolysis coupling partial gasification reaction furnace 13 to undergo gas-solid separation to obtain fine inorganic carbon particles and the high-temperature pyrolysis gas/gasification gas by the gas-solid separation. Preferably, an inlet of the first cyclone separator 14 is in communication with an outlet in the side upper portion of the pyrolysis coupling partial gasification reaction furnace 13 so that the high temperature pyrolysis gas/gasification gas in the pyrolysis coupling partial gasification reaction furnace 13 can sufficiently enter the first cyclone separator 14.

In the embodiment of the present invention, drying the biomass before pyrolysis/gasification of the biomass is beneficial to improve the efficiency of pyrolysis/gasification of the biomass, combustion products are separated by the first cyclone separator 14, the reductive pyrolysis gas/gasification gas obtained by separation enters the nitrogen oxide ultra-low emission system 2 to reduce the nitrogen oxide, and the combustion products are separated, so that full recovery of the inorganic carbon can be promoted, at the same time the entry of fine inorganic carbon in the combustion products into the nitrogen oxide ultra-low emission system 2 is reduced, and the negative emission of carbon is promoted.

In a preferential embodiment of the present invention, the pyrolysis coupling partial gasification reaction furnace 13 comprises a reaction furnace body 131, a reaction furnace shell 132, an inorganic carbon chamber 133, an inorganic carbon emission port 134 and a pyrolysis agent/gasification agent air port 135, the reaction furnace body 131 is disposed inside the reaction furnace shell 132, a circulation space of the pyrolysis agent/gasification agent is formed between the reaction furnace shell 132 and the reaction furnace body 131, the reaction furnace shell 132 is in communication with an outlet of the first pipeline 41, the inorganic carbon chamber 133 is disposed at the bottom of the pyrolysis coupling partial gasification reaction furnace 13, the bottom of the inorganic carbon chamber 133 is provided with the inorganic carbon emission port 134, and the pyrolysis agent/gasification agent air port 135 is formed in the reaction furnace body 131, so as to communicate the reaction furnace shell 132 with the reaction furnace body 131.

Specifically speaking, the reaction furnace body 131 is used as a reaction site of the pyrolysis coupling partial gasification reaction of the biomass, the reaction furnace shell 132 is used for accommodating and circulating the high-temperature pyrolysis agent/gasification agent to form a high-temperature cavity to provide heat needed for the pyrolysis coupling partial gasification reaction; the inorganic carbon chamber 133 is used for temporarily accommodating the inorganic carbon product, and the inorganic carbon emission port 134 is used for discharging the inorganic carbon product which is later used for returning to the field and making the carbon-based material; the pyrolysis agent/gasification agent air port 135 is used to provide an inlet for the high-temperature pyrolysis agent/gasification agent in the reaction furnace shell 132 to enter the reaction furnace body 131; and the pyrolysis agent/gasification agent air port 135 is formed in the bottom of one side of the reaction furnace body 131. Further, in order to facilitate the transportation of the inorganic carbon, an inorganic carbon conveying belt 136 is further disposed at the bottom of the inorganic carbon emission port 134, and the inorganic carbon is conveyed in the form of the conveying belt for returning to the field treatment or making the carbon-based materials such as activated carbon adsorbents, so as to realize the negative emission of carbon.

Due to the above mode, the reaction furnace shell 132 is in communication with the outlet of the first pipeline 41, and the pyrolysis agent/gasification agent provided by the air supply device enters the reaction furnace shell 132 to provide gas and heat required for the reaction furnace body 131, and the pyrolysis agent/gasification agent in the reaction furnace shell 132 enters the reaction furnace body 131 through the pyrolysis agent/gasification agent air port to enable the biomass to undergo the pyrolysis coupling partial gasification reaction. According to the different pyrolysis agents/gasification agents, the pure pyrolysis reaction can also take place in the reaction furnace body 131, for example, the pyrolysis agent/gasification agent is nitrogen, and the inorganic carbon in the combustion products generated in the reaction furnace body 131 enters the inorganic carbon chamber and passes through the inorganic carbon emission port to be discharged, which realizes recovery of the inorganic carbon. The inorganic carbon can be used for returning to field treatment and soil improvement. Since the inorganic carbon is difficult to be decomposed by the soil microorganisms, this part of carbon can be sealed for a long time, and finally negative emission of carbon is achieved. The inorganic carbon can also be used to make the carbon-based materials such as activated carbon adsorbents, which can adsorb the harmful substances and accumulate and store them to achieve negative emission of carbon.

In a preferable embodiment of the present invention, the nitrogen oxide ultra-low emission system 2 comprises a boiler 21 and air supply mechanisms, the boiler 21 is used for combustion of the fuel (solid fuel) and the pyrolysis gas/gasification gas to achieve ultra-low emission of the nitrogen oxide, the air supply mechanism provides gas required for the combustion of the fuel, and the boiler 21 is in communication with a top outlet of the first cyclone separator 14 through the second pipeline 42; an air outlet of the air supply mechanism is in communication with the interior of the boiler 21.

Due to the above mode, the fuel burns in the boiler 21 to supply heat to the outside, and the high-temperature pyrolysis gas/gasification gas with reducibility obtained by separation of the first cyclone separator 14 enters the boiler 21 through the second pipeline 42 to reduce the nitrogen oxides in the boiler 21 to nitrogen, which achieves the ultra-low emission of the nitrogen oxide.

Specifically, the boiler 21 is a circulating fluidized bed boiler, and the air supply mechanisms comprise a first air supply mechanism 22 and a second air supply mechanism 23, the first air supply mechanism 22 is disposed at the bottom of the boiler 21, and the second air supply mechanism 23 is disposed corresponding to a combustion zone of the pyrolysis gas/gasification gas in the boiler 21. The first air supply mechanism 22 supplies the gas required for fuel combustion, the second air supply mechanism 23 supplies the gas required for fuel combustion in a form of secondary air, the second air supply mechanism 23 is disposed at a position above the first air supply mechanism 22, and the boiler 21 is provided with a secondary air port corresponding to the position of the second air supply mechanism 23. By additionally disposing the secondary air port in the combustion zone of the biomass pyrolysis gas/gasification gas, on the premise that the total air supply volume remains unchanged, the air volume of primary air is reduced, and reduced air is supplied into a hearth in the form of the secondary air. When the primary air volume decreases, the combustion condition of biomass solid fuel in a dense phase zone will change, the nitrogen oxide is partially removed in the dense phase zone, and the total removal efficiency of the nitrogen oxide is improved.

Further, a fuel feed bin 24 and an oxygen meter 25 are further included in the boiler, the fuel feed bin 24 provides the fuel (including biomass/coal fuel) required for the combustion of the boiler 21, the number of the fuel feed bins is one or more, and the fuel feed bin 24 is preferably disposed at a lower position of the boiler 21, so as to provide the fuel for the lower portion of the boiler 21. The oxygen meter 25 is disposed inside the boiler 21, preferably, the oxygen meter 25 is disposed corresponding to the combustion zone of the pyrolysis gas/gasification gas in the boiler, and the oxygen meter 25 facilitates regulating and controlling the emission of the nitrogen oxide according to an excess air coefficient by monitoring the content of oxygen in the combustion zone of the biomass pyrolysis gas/gasification gas to calculate the excess air coefficient.

Due to the above mode, the plurality of fuel feed bins 24 can provide different fuels respectively, the fuel can be pure biomass fuel or pure coal fuel, and can also be a mixture of the biomass fuel and the coal fuel; the two fuel feed bins 24 are disposed at the same height of the boiler 21; the two fuel feed bins 24 respectively supply the biomass fuel and the coal fuel, so as to realize mixed combustion of the biomass/coal mixed-combustion solid fuel and the biomass pyrolysis gas/gasification gas, the content of a nitrogen element in the coal is higher than that in the biomass, and therefore, compared with the biomass fuel, the combustion of the coal fuel needs denitrification treatment more, so as to realize the ultra-low emission of the nitrogen oxides. A mixing ratio of biomass to coal can be determined according to the actual supply amount of a power plant. The oxygen meter 26 ensures the ultra-low emission of the nitrogen oxide by monitoring the content of the oxygen in the combustion zone of the pyrolysis gas/gasification gas and the excess air coefficient, and adaptively adjusting the air supply volume of the air supply mechanism.

Preferably, the nitrogen oxides ultra-low emission system 2 further comprises a second cyclone separator 26, the second cyclone separator 26 is used for separating solid products and gaseous products of combustion, and specifically used for separating high temperature flue gas and unburnt solid particles. An inlet of the second cyclone separator 26 is in communication with the upper portion of the boiler 21, an outlet of the second cyclone separator 26 is in communication with the lower portion of the boiler 21, and the unburnt solid particles separated out by the second cyclone separator 26 enter the boiler 21 through the lower portion of the boiler 21 to continue to burn.

In an optional embodiment of the present invention, the air supply device 3 comprises an air blower 31, an induced draught fan 32, a gas component analyzer 33 and a combustion chamber 35, the air blower 31 provides the pyrolysis agent/gasification agent (nitrogen/air) required for the system for use in carbon negative emission methods 1, an outlet pipeline of the air blower 31 is in communication with the first pipeline 41, and the induced draught fan 32 and the component analyzer 33 are disposed on the second pipeline 42 in a spaced mode; the second pipeline 42 communicates the first cyclone separator 14 with the boiler 21, the combustion chamber 35 is in communication with a second inlet 122 of the dryer 12 via a third pipeline 43, so that heat is provided for the interior of the dryer 12 to dry the biomass, and the combustion chamber 35 is communicated between the induced draught fan 32 and the gas component analyzer 33 through a fourth pipeline 44; and the component analyzer 33 is disposed between the boiler 21 and the induced draught fan 32 so as to facilitate analyzing the component content of the biomass pyrolysis gas/gasification gas entering the boiler 21.

The air supply device 3 further comprises a first outlet pipeline 1231 connecting a first outlet of the dryer 12 with an inlet of the first pipeline 41, and a water vapor generator 34. The combustion chamber 35 is used for combustion of part of the pyrolysis gas/gasification gas, and high-temperature flue gas produced by combustion enters the dryer 12 via the third pipeline 43 and provides heat for drying the biomass in the dryer 12, and then the high-temperature flue gas is provided for the pyrolysis coupling partial gasification reaction furnace 13 via the first outlet pipeline 1231 and the first pipeline 41 together with water vapor vaporized in the drying process of the biomass fuel as a pyrolysis agent/gasification agent; an outlet of the water vapor generator 34 is in communication with the inlet of the first pipeline 41. Namely, the outlet pipeline of the air blower 31, an outlet pipeline of the water vapor generator 34, and the first outlet pipeline 1231 of the dryer 12 are collected at an inlet end of the first pipeline 41, an outlet end of the first pipeline 41 is in communication with the reaction furnace shell 132 of the pyrolysis coupling partial gasification reaction furnace 13, and the water vapor generator 34, the air blower 31 and the combustion chamber 35 in communication with the first outlet 123 of the dryer 12 provide the pyrolysis agent/gasification agent required for the pyrolysis coupling gasification reaction; by controlling a flow ratio of the three pyrolysis agents/gasification agents from the air blower 31, the water vapor generator 34 and the combustion chamber 35, the yield of the pyrolysis gas/gasification gas and the component ratio can be regulated and controlled, and the yield of the inorganic carbon can be regulated and controlled.

Specifically, the air blower 31 is used for blowing air to provide the pyrolysis gas/gasification gas for the pyrolysis/pyrolysis coupling partial gasification reaction; the induced draft fan 32 is used for introducing the high-temperature pyrolysis gas/gasification gas generated in the pyrolysis coupling partial gasification reaction furnace 13 into the subsequent boiler 21, and the induced draft fan 32 is disposed to facilitate rapidly introducing the biomass pyrolysis gas/gasification gas separated by the first cyclone separator 14 into the boiler 21; an inlet of the induced draft fan 32 is connected to an outlet of the first cyclone separator 14, an outlet of the induced draft fan 32 is divided into two paths, one path is in communication with an inlet of the combustion chamber 35 via the fourth pipeline 44, a small part of the biomass pyrolysis gas/gasification gas enters the combustion chamber 35 for combustion, and a large part of the biomass pyrolysis gas/gasification gas is connected to an inlet of the gas component analyzer 33 via another path and enters the boiler 21 for reburning and denitration. The gas component analyzer 33 is used to monitor the component content of the biomass pyrolysis gas/gasification gas entering the boiler 21. The water vapor generator 34 is used to generate water vapor to provide the pyrolysis agent/gasification agent required for pyrolysis coupling partial gasification. An outlet of the combustion chamber 35 is in communication with a second inlet 122 of the dryer 12, the combustion chamber 35 is used for combustion of the small part of the biomass pyrolysis gas/gasification gas, the high-temperature flue gas generated by the combustion of the small part of the biomass pyrolysis gas/gasification gas enters the dryer 12, the high-temperature flue gas enables water in the biomass fuel to be vaporized to form water vapor, the high-temperature flue gas flows out through the first outlet 123 of the dryer 12 together with the water vapor, and the high-temperature flue gas generated by the combustion can also be supplied as the gasification agent to the reaction furnace body 131 for a partial gasification reaction to occur; an air blowing device 351 is connected to the inlet of the combustion chamber 35 to supply air required for pyrolysis of the pyrolysis gas/gasification gas.

In a preferable embodiment of the present invention, flow monitoring meters 5 are disposed on the outlet pipeline of the air blower 31, the outlet pipeline of the water vapor generator 34, the first outlet pipeline 1231 and the pipeline (outlet of the second pipeline 42) between the gas component analyzer 33 and the boiler 21, and used for monitoring flow of gas in each path in real time.

The outlet pipeline of the air blower 31 and the outlet pipeline of the water vapor generator 34 are further provided with electric butterfly valves 6a and 6b, and the flow control module controls the opening degrees of the electric butterfly valves 6a and 6b so as to control the flow of the water vapor and the air. The fourth pipeline 44 and the outlet of the second pipeline 42 (specifically, the pipeline located between the inlet of the gas component analyzer 33 and the outlet of the fourth pipeline 44) are provided with electric butterfly valves 6c and 6d, and the flow control module controls the flow of the high-temperature pyrolysis gas/gasification gas entering the boiler 21 and the flow of the flue gas entering the pyrolysis coupling partial gasification reaction furnace 13 by controlling the opening degree of the electric butterfly valves 6c and 6d. The flow control module further controls the flow of air entering the boiler 21 and monitors the content of the oxygen in the combustion zone of the pyrolysis gas/gasification gas in conjunction with the oxygen meter 26.

In a preferred embodiment of the present invention, each connecting pipeline has a heat preservation function and is provided with a temperature monitoring device (not shown in the FIGURES), wherein the temperature on the pipeline of the induced draft fan 32 should be controlled above 400° C. so as to prevent that high-temperature tar generated by pyrolysis/partial gasification condenses and blockage happens.

According to the embodiment of the present invention, by this system, the removal efficiency of the nitrogen oxides can reach 80-90%, the removal rate is high, and the ultra-low emission of the nitrogen oxide is achieved.

The structure of the nitrogen oxide ultra-low emission and system for use in carbon negative emission methods of the present invention is specifically described above, and a control method and a specific working flow thereof are described below.

The control method comprises:
when biomass in a system for use in carbon negative emission methods 1 has a pyrolysis coupling partial gasification reaction, opening electric butterfly valves 6a, 6b, 6c and 6d on an outlet pipeline of an air blower 31, an outlet pipeline of a water vapor generator 34, a fourth pipeline 44 and an outlet of a second pipeline 42; the air blower 31 blowing in air; and
adjusting a flow ratio of water vapor entering the system for use in carbon negative emission methods 1, air and high-temperature fuel gas generated in a combustion chamber 35 together with water vapor vaporized when biomass fuel is dried by controlling the opening degrees of the electric butterfly valves 6a, 6b, and 6c, thereby adjusting a component ratio of pyrolysis gas/gasification gas, the yield of the pyrolysis gas/gasification gas and the yield of inorganic carbon.

Furthermore, the method further comprises: controlling temperature in a boiler 21 (for example, performing adjustment according to the temperature of the boiler reflected by a temperature sensor), an excess air coefficient of a combustion zone of the pyrolysis gas/gasification gas in the boiler 21, a total excess air coefficient in the boiler 21, and a distribution ratio of the air supply volumes of a first air supply mechanism 22 and a second air supply mechanism 23 (controlling a ratio of the first air supply volume and the second air supply volume by disposing the electric butterfly valves on outlet pipelines of the first air supply mechanism 22 and the second air supply mechanism 23) so as to achieve ultra-low emission of nitrogen oxides.

A work process includes: the biomass fuel is fed into a dryer 12 via the biomass feed bin 11 for drying and dewatering, heat required for drying is provided by the high-temperature flue gas generated by partial biomass pyrolysis gas/gasification gas combusted in the combustion chamber 35 in an air supply system 3, and the biomass after being dried and dewatered is sent out of an outlet of the dryer 12, falls into an upper feed port of a pyrolysis coupling partial gasification reaction furnace 13 (introduced by taking a fixed bed reaction furnace as an example, the same below) and enters the pyrolysis coupling partial gasification reaction furnace 13, falls down under the action of gravity, and makes contact with a pyrolysis agent/gasification agent in the falling process to have a pyrolysis coupling partial gasification reaction. In the upper portion of the pyrolysis coupling partial gasification reaction furnace 13, a pyrolysis reaction mainly occurs, and volatiles of the biomass are heated and vaporized to produce reductive pyrolysis gas such as CO, $H_2$, $CH_4$ and $C_nH_m$, with the falling of the biomass, a partial gasification reaction occurs to the inorganic carbon to produce reductive gasification gas such as CO, $H_2$, $CO_2$, $CH_4$ and $C_nH_m$, and a content ratio of the gasification gas product is related to a ratio of gasification agents from different sources. The inorganic carbon after partial gasification falls into a furnace bar (not shown in the FIGURE) at the bottom of the pyrolysis coupling partial gasification reaction furnace 13, and enters an inorganic carbon chamber 133 via the furnace bar, and falls onto an inorganic carbon conveying belt 136 via an inorganic carbon emission port 134, and the biomass after the pyrolysis coupling partial gasification reaction is converted into inorganic carbon to be subjected to returning to field treatment; this part of inorganic carbon is difficult to be decomposed by soil microorganisms, and this part of carbon is just from $CO_2$ in air fixed by photosynthesis during the growth period of the biomass, thus achieving long-term sealing of this part of carbon in soil, namely, achieving negative emission of carbon; at the same time, the inorganic carbon products can also be used to make carbon-based materials, such as activated carbon adsorbents to adsorb harmful substances and then accumulate and store them, so as to realize the negative emission of carbon, thereby greatly reducing the emission of carbon dioxide.

The gasification agent required for the partial gasification reaction consists of a mixture of gas from three different sources, including: water vapor generated by the water vapor generator 34, air introduced by the air blower 31 and the high-temperature flue gas generated by the partial biomass pyrolysis gas/gasification gas combusted in the combustion chamber 35, and the water vapor vaporized during the drying process of biomass together with them; the gasification agents from the three sources are combined and enter a circulating space between a reaction furnace shell 132 and a reaction furnace body 131.

When the water vapor is used as the gasification agent, the gasification products are mostly $H_2$, CO, $CH_4$ and $C_nH_m$, and a promotion effect of the water vapor on the formation of $H_2$ is most obvious. When the air is used as the gasification agent, the gasification products are mostly CO and $CO_2$, when an air content increases, the content of CO will decrease and the content of CO2 will increase; when the gasification agent is the high-temperature flue gas (mainly comprising $CO_2$ and $N_2$) generated by partial biomass pyrolysis gas/gasification gas combustion, the gasification product is mostly CO generated by reacting CO2 with coke; the gasification products can be regulated and controlled by regulating and controlling the flow of the gasification agents from different sources according to the demand for the content ratio of the gasification gas products. The gasification agents from the three sources are combined and enter the reaction furnace shell 132 together, and the high-temperature flue gas provided by the combustion chamber 35 contains a large amount of heat, so that the reaction hearth shell 132 forms a high-temperature cavity, which can provide heat required for the pyrolysis reaction and the partial gasification reaction occurring in the reaction furnace body 131; and the gasification agent in the high-temperature cavity enters the reaction furnace body 131 through a pyrolysis agent/gasification agent air port 135 under the action of pressure, and participates in the pyrolysis coupling partial gasification reaction of the biomass. The pyrolysis gas/gasification gas generated after the biomass has the pyrolysis coupling partial gasification reaction enters a first cyclone separator 14 together with fine inorganic carbon particles, after the inorganic carbon particles are separated by the first cyclone separator 14, the pyrolysis gas/gasification gas is sent to a subsequent system via an induced draft fan 33, and the separated fine inorganic carbon particles fall onto the inorganic carbon conveying belt 16 via the inorganic carbon emission port 134, and are then subjected to returning to field treatment or made into the carbon-based materials such as activated carbon adsorbents; after flowing out of an outlet of the induced draft fan 32, the high-temperature pyrolysis gas/gasification gas is divided into two paths, a small part of the pyrolysis gas/gasification gas enters the above-mentioned combustion chamber 35 for a combustion reaction, the contents of CO, $CO_2$, Hz, $CH_4$, $C_nH_m$, $H_2O$ and other gas in the other part of the pyrolysis gas/gasification gas are monitored via the gas component analyzer 33, then the pyrolysis gas/gasification gas enters the boiler 21 for reburning, and the flow of the two paths of gas can be controlled according to the opening degrees of the electric butterfly valves 6c and 6d disposed on the fourth pipeline 44 and the second pipeline 42.

In the boiler 21, the biomass solid fuel is fed into a dense phase zone of the boiler through a feed bin 24 for combustion, and air required for combustion is supplied by the air blower 31 and enters a hearth from the bottom of the hearth of the boiler 21 through an air distribution plate (not shown in the FIGURES). Preferably, a part of the air can be introduced in the form of secondary air, that is, supplied in through the second air supply mechanism 23. The nitrogen oxides produced by the combustion of the biomass solid fuel meet the reductive high-temperature biomass pyrolysis gas/gasification gas which is fed into the hearth as reburning gas during the upward movement, and in the reburning process of this part of reductive pyrolysis gas/gasification gas, a large amount of nitrogen oxides are reduced to nitrogen which is harmless to air, so that the ultra-low emission of the nitrogen oxides is achieved. $H_2$, $C_nH_m$ and CO mainly play a reduction role, and the process mechanism of the specific reduction reaction is as follows:

1. $H_2$ Reduction $H_2 \rightarrow 2H'$ \hfill (1)

$H+NO \rightarrow \cdot HNO'$ \hfill (2)

$HNO'+H \rightarrow NH'+OH'$ \hfill (3)

$NH'+NO \rightarrow N_2+OH'$ \hfill (4)

$NH'+NO \rightarrow N_2O+H, N_2O+H \rightarrow N_2+OH'$ \hfill (5)

$NH'+NO_2 \rightarrow N_2O+OH', N_2O+H \rightarrow N_2+OH'$ \hfill (6)

$H_2+NO_x \rightarrow N_2+H_2O$ (total) \hfill (7)

2. $C_nH_m$ Reduction $C_nH_m \rightarrow CH_2'/CH_3'+H'$ \hfill (8)

$CH_2'+NO \rightarrow HCNO+H', CH_2'+NO \rightarrow HCN+OH'$ \hfill (9)

$CH_3'+NO \rightarrow H_2CN'+OH', CH_3+NO \rightarrow HCN+H_2O$ \hfill (10)

$HCN+O' \rightarrow NH'+CO$ \hfill (11)

$HCNO+O' \rightarrow NH'+CO_2$ \hfill (12)

$H_2CN+O' \rightarrow NH'+CO+2H_2O$ \hfill (13)

$NH'+NO \rightarrow N_2+OH'$ \hfill (4)

$NH'+NO \rightarrow N_2O+H, N_2O+H \rightarrow N_2+OH'$ \hfill (5)

$NH'+NO_2 \rightarrow N_2O+OH', N_2O+H \rightarrow N_2+OH'$ \hfill (6)

$C_nH_m+O' \rightarrow H'+HCCO'$ \hfill (14)

$HCCO'+NO \rightarrow HCNO+CO$ \hfill (15)

$HCCO'+NO \rightarrow HCN+CO_2$ \hfill (16)

$HCN+O' \rightarrow NH'+CO$ \hfill (11)

$HCNO+O' \rightarrow NH'+CO_2$ \hfill (12)

$NH'+NO \rightarrow N_2+OH'$ \hfill (4)

$NH'+NO \rightarrow N_2O+H, N_2O+H \rightarrow N_2+OH'$ \hfill (5)

$NH'+NO_2 \rightarrow N_2O+OH', N_2O+H \rightarrow N_2+OH'$ \hfill (6)

$C_nH_m+NO_x \rightarrow N_2+CO_2+H_2O$ (total) \hfill (13)

3. CO Reduction $NO+NO \rightarrow ON=NO$ (NO dimer) \hfill (17)

$CO+ON=NO \rightarrow CO_2+N_2O$ \hfill (18)

$CO+N_2O \rightarrow CO_2+N_2$ \hfill (19)

$2CO+2NO \rightarrow 2CO_2+N_2$ (total) \hfill (20)

$CH_4$, $H_2$, and CO are three components that play a major role in the reduction process of the nitrogen oxides since $CH_4$ is the main component gas in $C_nH_m$. It can be seen from the reaction formula, reducibility of $H_2$ is mainly reflected in the reduction of NOx by the intermediate product NH', NOx can be directly reduced by NH' to $N_2$ (as shown in equation (4)), and can also be reduced by NH' to $N_2O$, and then the $N_2O$ is reduced by H' radicals to $N_2$ (such as equations (5) and (6));

Reduction of $NO_x$ by $CH_4$ is mainly reflected in reduction of $NO_x$ by the intermediate product $CH_2'/CH_3'$, and also includes reduction of NO by the intermediate product HCCO', and a final conversion step to $N_2$ is similar to $H_2$ reduction; reduction of $NO_x$ by CO is mainly reflected in reduction of NO by CO, and it goes through the intermediate product of NO dimer and is finally reduced to $N_2$. Among three reducing agents ($CH_4$, $H_2$ and CO), the removal efficiency of the nitrogen oxides by $CH_4$ and $H_2$ is higher than that by CO, therefore, the content of $CH_4$ and $H_2$ in the gasified gas should be increased as much as possible to realize the ultra-low emission of the nitrogen oxide.

The three gasification agents from different sources: increasing the proportion of the water vapor gasification agent will increase the content of $H_2$ in the gasification product, but will reduce the content of CO and $CH_4$, and will also reduce the heating value of the gasification gas;

increasing the proportion of the air gasification agent will increase the content of CO and $CH_4$ in the gasification product and the heating value of the gasification gas, but will decrease the content of $H_2$;

increasing the content of flue gas ($N_2$ and $CO_2$ being main components) produced by combustion of a small part of the gasification gas and water vapor together with it will increase the content of CO in the gasification product, reduce the reducibility of the gasification product, and also cannot greatly increase the heating value of the gasification gas, so the main function of this part of gas is to provide heat for the pyrolysis coupling partial gasification reaction in the above-mentioned implementation process, and the content of the high-temperature flue gas as the gasification agent should be reduced as far as possible under the condition of ensuring sufficient heat.

In conclusion, the content of the water vapor gasification agent and the air gasification agent should be reasonably controlled, so that the gasification product of pyrolysis coupling partial gasification has both extremely high nitrogen removal efficiency and high heating value for fuel, so that the energy is fully utilized, and the amount of this high-temperature flue gas gasification agent should be controlled as low as possible, but should meet the heat required for the pyrolysis/gasification reaction. When the content of $H_2$, $CH_4$ and CO in the gasification product is 10-15%, 5-10% and 25-30%, the gasification gas has extremely high removal efficiency on the nitrogen oxides and high heating value at the same time, so that the energy is fully utilized and the goal of ultra-low emission of the nitrogen oxide is achieved.

In addition to the component ratio of the gasification agents from various sources in the pyrolysis gas/gasification gas, temperature of the hearth, the excess air coefficient in the combustion zone of the biomass pyrolysis gas/gasification gas, the water content of the fuel and the air volume ratio between primary and secondary air supply are all factors to be considered in achieving the ultra-low emission of the nitrogen oxides. As the temperature increases, the $NO_x$ reduction efficiency by biomass pyrolysis gas/gasification gas reburning will increase, but the $NO_x$ formation efficiency will also increase when the fuel burns in the dense phase zone, and the hearth temperature of the boiler 21 should be controlled to be 850-950° C. to reduce the nitrogen oxide formation efficiency in the dense phase zone and improve the nitrogen oxide removal efficiency in a reduction zone. Preferably, an additional heating device may be added to the combustion zone of the biomass pyrolysis gas/gasification gas to control the temperature of the local zone to be 1100-1200° C. to improve the reduction efficiency of the pyrolysis gas/gasification gas for the nitrogen oxides.

The excess air coefficient of the combustion zone of the biomass pyrolysis gas/gasification gas is also a key factor affecting the removal efficiency of the nitrogen oxide. Only by ensuring that the zone is in a fuel-rich combustion condition (excess air coefficient less than 1) can the nitrogen oxides be removed with high efficiency. The air supply amount of the air supply mechanism should be adjusted according to the feeding amount of the biomass solid fuel and the gas feeding flow of the biomass pyrolysis gas/gasification gas, the total excess air coefficient is controlled to be 1.2-1.6, and the excess air coefficient of the combustion zone of the biomass pyrolysis gas/gasification gas is controlled to be 0.7-0.8 by adjusting the flow of the biomass pyrolysis gas/gasification gas (adjusting the flow of the pyrolysis gas/gasification gas entering the combustion zone of the boiler 21 by controlling the opening degree of the electric butterfly valve 6d), so as to avoid the oxidation of the intermediate product NH' to $NO_x$ by excess $O_2$, and ensure the ultra-low emission of the nitrogen oxides. Preferably, the oxygen meter 26 can be added to the combustion zone of the biomass pyrolysis gas/gasification gas to monitor the excess air coefficient of the zone in real time and performs regulation and control.

Preferably, the air volume of the primary air is reduced while keeping the total air supply amount unchanged, and the reduced air is supplied to the hearth in the form of secondary air. When the amount of the primary air decreases, the combustion condition of the biomass solid fuel in the dense phase zone of the boiler 21 changes, the amount of NH' oxidized to NO decreases, and NO reacts with non-oxidized NH' to generate $N_2$, so that the nitrogen oxides are partially removed in the dense phase zone. The excess air coefficient in the dense phase zone should be controlled to be 0.8-0.9, in which case the NO generated by the oxidation of NH' just right reacts with NH' to generate $N_2$, and the remaining $NO_x$ is generated basically by the oxidation of HCN, so as to reduce the pressure for removing the nitrogen oxide borne by the combustion zone of the biomass pyrolysis gas/gasification gas and improve the total removal efficiency of the nitrogen oxide.

The water content of the biomass solid fuel also affects the removal efficiency of the nitrogen oxide. If the water content of the biomass solid fuel is high, the volatile vaporizing process is retarded to slow down, the retention time of volatiles in the dense phase zone is shortened, and a combustion section moves upward as a whole. At this time, the primary air volume should be appropriately reduced and the secondary air volume should be appropriately increased, otherwise a large amount of NO would be generated in the dense phase zone.

In summary, to achieve ultra-low emission of the nitrogen oxide, the factors to be regulated and controlled are the component ratio and flow of the biomass pyrolysis gas/gasification gas (regulated and controlled by the flow ratio of three pyrolysis agents/gasification agents), the hearth temperature, the excess air coefficient of the combustion zone of the pyrolysis gas/gasification gas, the total excess air coefficient, the primary and secondary air volume ratio of the air supply mechanism and the water content of the biomass solid fuel.

Second Embodiment

In the second embodiment of the present invention, a pyrolysis coupling partial gasification reaction of biomass takes place in a pyrolysis coupling partial gasification reaction furnace 13 (taking a fixed bed reaction furnace as an example), and if the biomass only has a pyrolysis reaction in an inert gas environment without a partial gasification reaction, the content of reductive gas in a gas product, especially the content of H₂ and CO, will be greatly decreased, but the content of inorganic carbon is increased to some extent. If pyrolysis gas with a low $H_2$ and CO content can still achieve high nitrogen removal efficiency, it can be controlled that only the pyrolysis reaction takes place in the pyrolysis coupling partial gasification reaction furnace 13, so as to improve the yield of the inorganic carbon while ensuring the high nitrogen removal efficiency, and achieve negative emission of carbon to a greater degree.

In this embodiment, an electric butterfly valve 6b on an outlet pipeline of a water vapor generator 34, and an electric butterfly valve 6c on a fourth pipeline 44 are closed, and electric butterfly valves 6a and 6d on an outlet pipeline of an air blower 31 and a second pipeline 42 are opened, air supply of the air blower 31 is changed to nitrogen supply, and nitrogen is blown into the pyrolysis coupling partial gasification reaction furnace 13 by the air blower 31, so that the biomass has a pure pyrolysis reaction under a nitrogen atmosphere. The subsequent processes are the same and will not be described again here.

The above are only preferable embodiments of the present invention and are not intended to limit the present invention. Any modifications, equivalent replacements, improvements, etc. made within the spirit and principles of the present invention shall be included in the protection scope of the present invention.

The invention claimed is:

1. A system, comprising:
a system for use in a carbon negative emission method;
wherein the system for use in a carbon negative emission method is configured to produce a pyrolysis coupling partial gasification reaction of a biomass or produce a pure pyrolysis reaction of the biomass to generate inorganic carbon and pyrolysis gas/gasification gas, wherein the inorganic carbon is usable for making carbon-based materials to realize negative emission of carbon,
a system having reduced nitrogen oxide emissions;
wherein the system having reduced nitrogen oxide emission is configured for mixed combustion of fuel with the pyrolysis gas/gasification gas to remove nitrogen oxides generated by combustion of the fuel,
an air supply device;
wherein the air supply device is in communication with the system for use in a carbon negative emission method via a first pipeline, and provides a pyrolysis agent/gasification agent required for biomass pyrolysis coupling partial gasification, and the air supply device is in communication with the system for use in a carbon negative emission method and the system having reduced nitrogen oxide emission via a second pipeline, wherein the pyrolysis gas/gasification gas enters the system having reduced nitrogen oxide emission via the second pipeline, and is in mixed combustion with fuel in the system having reduced nitrogen oxide emission to reduce and remove the nitrogen oxides; and
a flow control module,
wherein the flow control module controls a flow ratio of three pyrolysis agents/gasification agents, wherein said three pyrolysis agents/gasification agents originate from an air blower, a water vapor generator, and a combustion chamber respectively entering the system for use in a carbon negative emission method and flow of the pyrolysis gas/gasification gas and air entering the system having reduced nitrogen oxide emission,
wherein the system for use in a carbon negative emission method comprises a dryer, a pyrolysis coupling partial gasification reaction furnace, and a first cyclone separator sequentially in communication via pipelines,
wherein the dryer dries the biomass and wherein the dried biomass enters the pyrolysis coupling partial gasification reaction furnace via an outlet of the dryer to undergo the pyrolysis coupling partial gasification reaction or the pure pyrolysis reaction, and wherein a product after reaction of the biomass enters the first cyclone separator via an outlet of the pyrolysis coupling partial gasification reaction furnace to undergo gas-solid separation,
wherein the pyrolysis coupling partial gasification reaction furnace comprises:
a reaction furnace body;
a reaction furnace shell;
an inorganic carbon chamber;
an inorganic carbon emission port and a pyrolysis agent/gasification agent air port,
wherein the reaction furnace body is disposed inside the reaction furnace shell and a circulation space of the pyrolysis agent/gasification agent is formed between the reaction furnace shell and the reaction furnace body, wherein the reaction furnace shell is in communication with an outlet of the first pipeline,
wherein the inorganic carbon chamber is disposed at a bottom of the pyrolysis coupling partial gasification reaction furnace and a bottom of the inorganic carbon chamber is provided with the inorganic carbon emission port, and
wherein the pyrolysis agent/gasification agent air port is formed in the reaction furnace body,
wherein the system with reduced nitrogen oxide emission comprises:
a boiler;
a first air supply mechanism and a second air supply mechanism, wherein the first air supply mechanism is disposed at a bottom of the boiler, and the second air supply mechanism is disposed corresponding to a combustion zone of the pyrolysis gas/gasification gas in the boiler,
wherein the boiler is configured to combust the fuel and the pyrolysis gas/gasification gas, and the air supply mechanisms are configured to be in communication with the boiler to provide the boiler with gas required for combustion of the fuel, and the boiler is in communication with a top outlet of the first cyclone separator through the second pipeline; and
at least one fuel feed bin and an oxygen meter, wherein each of the at least one fuel feed bin(s) provides fuel required for combustion within the boiler and the oxygen meter is disposed corresponding to the combustion zone of the pyrolysis gas/gasification gas in the boiler, and the oxygen meter is configured to monitor content of oxygen in the combustion zone of the pyrolysis gas/gasification gas in the boiler,
wherein the air supply device comprises the air blower and the combustion chamber, and an outlet pipeline of the air blower is in communication with an inlet of the first pipeline, such that the air blower provides the pyrolysis agent/gasification agent required for biomass pyrolysis coupling partial gasification, the pyrolysis agent/gasification agent comprises nitrogen or air,
wherein the combustion chamber is in communication with an inlet of the dryer via a third pipeline, the combustion chamber is configured to combust part of the pyrolysis gas/gasification gas, and the combustion chamber is in communication with a middle part of the second pipeline via a fourth pipeline, and the first cyclone separator is in communication with the boiler via the second pipeline;

wherein flue gas generated by combustion in the combustion chamber enters the dryer through the third pipeline and provides heat for drying the biomass in the dryer, and after drying, flue gas that had entered the dryer and provided heat for drying biomass in the dryer enters the first pipeline together with water vapor vaporized in a process of drying biomass fuel;

wherein, in an upper portion of the pyrolysis coupling partial gasification reaction furnace, a pyrolysis reaction occurs, and volatiles of the biomass are heated and vaporized to produce reductive pyrolysis, wherein a partial gasification reaction occurs to inorganic carbon of the biomass falling in the pyrolysis coupling partial gasification reaction furnace to produce reductive gasification gas.

2. The system according to claim 1, further comprising an induced draft fan and a gas component analyzer, wherein the induced draft fan is disposed at an inlet of the second pipeline, and the gas component analyzer is disposed at an outlet of the second pipeline.

3. The system according to claim 2, wherein the air supply device further comprises:

a first outlet pipeline and a water vapor generator, wherein the inlet of the first-pipeline is in communication with a first outlet of the dryer via the first outlet pipeline;

flue gas exiting the first outlet of the dryer is provided for the pyrolysis coupling partial gasification reaction furnace via the first outlet pipeline together with the water vapor vaporized and the process of drying biomass fuel as the pyrolysis agent/gasification agent; and an outlet pipeline of the water vapor generator is in communication with the inlet of the first pipeline, and the water vapor generator provides the pyrolysis agent/gasification agent required for the pyrolysis coupling partial gasification reaction furnace.

4. The system according to claim 3, further comprising a plurality of flow monitoring meters and a plurality of electric butterfly valves, wherein the plurality of flow monitoring meters are respectively disposed on the outlet pipeline of the air blower, the outlet pipeline of the water vapor generator, the first outlet pipeline, and the outlet of the second pipeline;

wherein the plurality of electric butterfly valves comprise:
a first electric butterfly valve disposed on the outlet pipeline of the air blower;
a second electric butterfly valve disposed on the outlet pipeline of the water vapor generator;
a third electric butterfly valve disposed on the fourth pipeline; and
a fourth electric butterfly valve disposed on the outlet of the second pipeline.

* * * * *